(12) United States Patent
Lin (10) Patent No.: US 7,227,728 B2
(45) Date of Patent: Jun. 5, 2007

(54) METHOD AND APPARATUS FOR A CURRENT-PERPENDICULAR-TO-PLANE GIANT MAGNETO-RESISTANCE SENSOR WITH EMBEDDED COMPOSITE FILM

(75) Inventor: Tsann Lin, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 346 days.

(21) Appl. No.: 10/652,835

(22) Filed: Aug. 29, 2003

(65) Prior Publication Data

US 2005/0047027 A1   Mar. 3, 2005

(51) Int. Cl.
*G11B 5/39* (2006.01)

(52) U.S. Cl. .................................. 360/324.1

(58) Field of Classification Search ... 360/324.1–324.2
See application file for complete search history.

(56) References Cited

U.S. PATENT DOCUMENTS

| 6,064,552 | A * | 5/2000 | Iwasaki et al. ............. 360/322 |
| 6,686,068 | B2 * | 2/2004 | Carey et al. ............. 428/811.3 |
| 6,707,649 | B2 * | 3/2004 | Hasegawa et al. ...... 360/324.12 |
| 6,781,799 | B2 * | 8/2004 | Seyama et al. ......... 360/324.11 |
| 2002/0034029 | A1 | 3/2002 | Aoyagi et al. |
| 2002/0048128 | A1 * | 4/2002 | Kamiguchi et al. ...... 360/324.1 |
| 2002/0135955 | A1 | 9/2002 | Ono et al. |
| 2002/0146580 | A1 | 10/2002 | Wang et al. |
| 2003/0039083 | A1 | 2/2003 | Seyama et al. |
| 2003/0053269 | A1 | 3/2003 | Nishiyama |
| 2004/0042127 | A1 * | 3/2004 | Hoshiya et al. ............. 360/322 |
| 2004/0246631 | A1 * | 12/2004 | Dieny et al. ............. 360/324.1 |

FOREIGN PATENT DOCUMENTS

JP   2001-261844   8/2001

OTHER PUBLICATIONS

U.S. Appl. No. 10/743,130, filed Sep. 30, 2004, Yoshikawa, et al.

* cited by examiner

*Primary Examiner*—A. J. Heinz
(74) *Attorney, Agent, or Firm*—David W. Lynch; Chambliss Bahner & Stophel (57) ABSTRACT

A Current-Perpendicular-to-Plane (CPP) Giant Magneto-Resistance (GMR) sensor (700/800) has either a composite film (708) embedded into a ferromagnetic reference layer (710) or a composite film (806) embedded into a ferromagnetic keeper layer (804). The embedded composite film is deposited by sputtering from a ferromagnetic metallic target and a non-magnetic oxide target simultaneously or sequentially. Varying sputtering powers of the ferromagnetic metallic and non-magnetic oxide targets leads to various volume fractions of ferromagnetic metallic and non-magnetic oxide phases. By carefully adjusting these volume fractions, the product of junction resistance and area of the CPP GMR sensor (700/800) can be finely tuned to a designed value and thus provide optimum read performance of the CPP GMR sensor (700/800) for magnetic recording at ultrahigh densities.

12 Claims, 7 Drawing Sheets

METHOD AND APPARATUS FOR A CURRENT-PERPENDICULAR-TO-PLANE GIANT MAGNETO-RESISTANCE SENSOR WITH EMBEDDED COMPOSITE FILM

BACKGROUND OF THE INVENTION

1. Field of the Invention

This invention relates in general to Giant Magneto-Resistance (GMR) sensors for magnetic storage systems, and more particularly to a method and apparatus for a Current-Perpendicular-to-Plane (CPP) GMR sensor having an embedded composite film.

2. Description of Related Art

Magnetic recording is a key and invaluable segment of the information-processing industry. While basic principles are one hundred years old for early tape devices, and over forty years old for magnetic hard disk drives, an influx of technical innovations continues to extend the storage capacity and performance of magnetic recording products. For hard disk drives, the areal density or density of written data bits on the magnetic medium has increased by a factor of more than two million since the first disk drive was applied to data storage. Since 1991, the areal density has grown by a 60% compound growth rate, which is based on corresponding improvements in heads, media, drive electronics, and mechanics.

Magnetic recording heads have been considered the most significant factor in the areal-density growth. The ability of the magnetic recording heads to write magnetic data on and subsequently read the magnetic data from a recording medium, at data densities well into the Gigabits per Square Inch (Gbits/in$^2$) range gives hard disk drives the power to remain the dominant storage device for many years to come.

Important components of computing platforms are mass storage devices including magnetic tape and disk drives, where magnetic tape drives are popular, for example, in data backup applications. The magnetic disk drive includes a rotating magnetic disk, a magnetic recording head that is suspended by a suspension arm above the rotating magnetic disk and an actuator that swings the suspension arm to place the magnetic recording head over selected circular tracks on the rotating magnetic disk. The magnetic recording head is directly mounted on a slider that has an Air-Bearing Surface (ABS) between the slider and the rotating magnetic disk. The suspension arm biases the slider into contact with the surface of the magnetic disk when the magnetic disk is not rotating. However, when the magnetic disk rotates, air is swirled by the rotating magnetic disk adjacent to the ABS, causing the slider to fly on a cushion of air just above the surface of the rotating magnetic disk. The magnetic recording head is employed for writing magnetic data on and subsequently reading magnetic data from a magnetic medium that is deposited on the top or bottom surface of the rotating magnetic disk. The magnetic recording head is connected to processing circuitry that operates according to a computer program to implement the write and read functions.

The read element of the magnetic recording head currently used in the magnetic tape and disk drives is a GMR sensor, which mainly comprises three GMR-functional layers: a ferromagnetic sense layer; a conducting spacer layer; and a ferromagnetic reference layer. The GMR sensor detects magnetic-field signals through the variation of its resistance as a function of the strength and direction of the magnetic-field signals coming from written data on a magnetic medium. Due to a GMR effect, the resistance varies as the cosine of the angle between the magnetic orientations of the ferromagnetic sense and reference layers. The resistance variations cause corresponding current/voltage variations, and thus written data can be read from the magnetic medium.

To ensure the GMR effect, the magnetic orientation of the ferromagnetic sense layer must be free, while that of the ferromagnetic reference layer must be either Anti-Ferromagnetic (AFM)-pinned or self-pinned. The magnetic orientation of the ferromagnetic reference layer is AFM pinned by an adjacent AFM pinning layer through anti-ferromagnetic/ferromagnetic exchange coupling. The magnetic orientation of the ferromagnetic reference layer is self-pinned by its own intrinsic and extrinsic uniaxial anisotropies. To reinforce AFM-pinning and self-pinning, two additional layers: an anti-parallel (AP) pinning layer; and a ferromagnetic keeper layer, are inserted into the AFM pinning and ferromagnetic reference layers. The AP-pinning is achieved through AP ferromagnetic/ferromagnetic exchange coupling across the AP-pinning layer.

Recent hard disk drive designs have utilized this GMR sensor in a Current-In-Plane (CIP) mode, where a sense current flows between top and bottom insulating gap layers, which isolate the GMR sensor from top and bottom ferromagnetic shield layers, respectively, in a direction parallel to layer interfaces of the GMR sensor. Such designs yield optimism to suffice up to areal densities close to 100 Gbits/in$^2$. However, research efforts continue to find even better read elements so that areal densities may be boosted into many hundreds of Gbits/in$^2$ range.

One such research effort is the utilization of a read element in a CPP mode, where the sense current flows from the top/bottom to the bottom/top ferromagnetic shield layers without the need for the top and bottom insulating gap layers, in a direction perpendicular to layer interfaces of the read element. Due to the elimination of the top and bottom insulating gap layers, the read element utilized in the CPP mode provides higher linear resolution than that utilized in the CIP mode and thus higher areal densities can be achieved.

The most extensively explored read element utilized in the CPP mode is a Tunneling Magneto Resistance (TMR) sensor with an Al—O amorphous barrier layer. In this CPP TMR sensor, the magnitude of its TMR is dependent upon spin directions of conduction electrons or polarizations. This CPP TMR sensor comprises a Ta seed layer, a Pt—Mn pinning layer, a Co—Fe keeper layer, a Ru AP pinning layer, a Co—Fe reference layer, an Al—O barrier layer, Co—Fe/Ni—Fe sense layers, and Cu/Ta cap layers. The Al—O barrier layer is typically formed by depositing an Al film in an argon gas and oxidizing it either in an oxygen gas or in a mixture of argon and oxygen gases. Optimal oxidation is essential for this CPP TMR sensor with the Al—O barrier layer to attain good magnetic and TMR properties. Oxidation in an oxygen gas of 2 Torr results in a CPP TMR sensor with a product of junction resistance and area of around 5 $\Omega$-$\mu m^2$ and a TMR coefficient of around 15%. Oxidation in a mixture of argon and oxygen gases of 0.48 and 0.02 Torr, respectively, results in a CPP TMR sensor with a product of junction resistance and area of around 2 $\Omega$-$\mu m^2$ and a TMR coefficient of around 10%.

An alternative read element utilized in the CPP mode is a CPP TMR sensor with a polycrystalline Mg—O barrier layer. This CPP TMR sensor comprises a Ta seed layer, a Pt—Mn pinning layer, a Co—Fe keeper layer, a Ru AP-pinning layer, a Co—Fe reference layer, an Mg—O barrier layer, Co—Fe/Ni—Fe sense layers, and Cu/Ta cap layers. The Mg—O barrier layer is typically formed by depositing a Mg film in an argon gas, depositing a Mg—O film in a mixture of argon (or xenon) and oxygen gases, and oxidizing both the Mg and Mg—O films in an oxygen gas. Optimal oxygen doping used for the formation of the Mg—O film is essential for the CPP TMR sensor to attain good magnetic and TMR properties. Oxygen doping in a mixture of xenon and oxygen gases at 0.12 and 0.06 Torr, respectively, results in a CPP TMR sensor with a product of junction resistance and area of around 5 $\Omega$-$\mu m^2$ and a TMR coefficient of around 20%.

Use of these CPP TMR sensors for magnetic recording at ultrahigh densities encounter several difficulties. First, when either of these CPP TMR sensors exhibits a TMR coefficient of 15% or higher, its product of junction resistance and area, e.g., 5 $\Omega$-$\mu m^2$, is too high to prevent electrostatic discharge damage. Second, although the product of junction resistance and area can be reduced to 2 $\Omega$-$\mu m^2$ or below, the TMR coefficient becomes lower than a designed value, e.g., 15%. In addition, to attain such a low product of junction resistance and area, the barrier layer must be very thin. As a result, pinholes may exist in the thin barrier layer, causing thermal stability concerns for the CPP TMR sensor. Further explorations for a CPP TMR sensor with a pinhole-free barrier layer, a product of junction resistance and area of below 1 $\Omega$-$\mu m^2$, and a TMR coefficient of above 15%, are still highly desired.

The difficulties in attaining a low product of junction resistance and area originate from the high resistivities, $10^8$ and $10^6$ $\mu\Omega$-$cm^2$, respectively, of the Al—O and Mg—O barrier layers. In the serial circuit of the CPP TMR sensor, a high-resistivity layer is a major resistance component and thus plays a dominant role in establishing the product of junction resistance and area. Hence, to attain a low product of junction resistance and area, a low-resistivity barrier layer should be selected. A GMR sensor with a Cu spacer layer having a resistivity of 2.9 $\mu\Omega$-$cm^2$, may be utilized in the CPP mode. However, this CPP GMR sensor with the Cu spacer layer is not a viable option at all, since its product of junction resistance and area is very low, i.e., 0.001 $\Omega$-$\mu m^2$. With such a low product of junction resistance and area, the sensor resistance will be too low to provide a required signal amplitude. In general, a product of junction resistance and area ranging from 0.1 to 1 $\Omega$-$\mu m^2$ is preferred for magnetic recording at ultrahigh densities.

It can be seen therefore, that there is a need for an improved read element utilized in a CPP mode, which exhibits a product of junction resistance and area preferably ranging from 0.1 to 1 $\Omega$-$\mu m^2$.

SUMMARY OF THE INVENTION

To overcome the limitations in the prior art described above, and to overcome other limitations that will become apparent upon reading and understanding the present specification, the present invention discloses a method and apparatus for a CPP GMR sensor having an embedded composite film. The CPP GMR sensor exhibits the product of junction resistance and area in a designed range for magnetic recording at ultrahigh densities.

In one embodiment of the present invention, a method of forming a CPP GMR sensor is provided. The method comprises forming a ferromagnetic keeper layer having a first magnetic orientation, forming a ferromagnetic reference layer having a second magnetic orientation anti-parallel to the first magnetic orientation, forming a ferromagnetic sense layer having a magnetic orientation that varies in response to an external magnetic-field signal, and embedding a composite film with a conducting phase and an insulating phase into either the ferromagnetic keeper or reference layer.

In another embodiment of the present invention, a CPP GMR sensor is provided. The CPP GMR sensor comprises a ferromagnetic keeper layer having a first magnetic orientation, a ferromagnetic reference layer having a second magnetic orientation anti-parallel to the first magnetic orientation, a ferromagnetic sense layer having a magnetic orientation that varies in response to an external magnetic-field signal, and embedding a composite film into either the ferromagnetic keeper or reference layer. The embedded composite film comprises a ferromagnetic metal with a conducting phase, and a non-magnetic oxide with an insulating phase.

In another embodiment of the present invention, a magnetic storage system is provided. The magnetic storage system comprises a magnetic medium and a CPP GMR sensor disposed proximate to the magnetic medium. The CPP GMR sensor comprises a ferromagnetic keeper layer having a first magnetic orientation, a ferromagnetic reference layer having a second magnetic orientation anti-parallel to the first magnetic orientation, a ferromagnetic sense layer having a magnetic orientation that varies in response to an external magnetic-field signal, and a composite film embedded into either the ferromagnetic keeper or reference layer. The embedded composite film comprises a ferromagnetic metal with a conducting phase and a non-magnetic oxide with an insulating phase.

These and various other advantages and features of novelty which characterize the invention are pointed out with particularity to the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a method in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustrating the specific embodiments in which the invention may be practiced. It is to be understood that other embodiments may be utilized as structural changes may be made without departing from the scope of the present invention.

The present invention provides a method and apparatus that embeds a composite film, composed of a conducting phase and an insulating phase, into either the ferromagnetic keeper or reference layer. In so doing, a sense current is confined to flow only through the conducting portions of the composite film. The product of junction resistance and area may thus be varied by adjusting the volume fraction of the insulating phase in the composite film. Further, the CPP GMR sensor according to the present invention decreases its susceptibility to electrostatic discharge damage and ensures a high signal amplitude, as a result of the optimized product of junction resistance and area.

Figure 1:
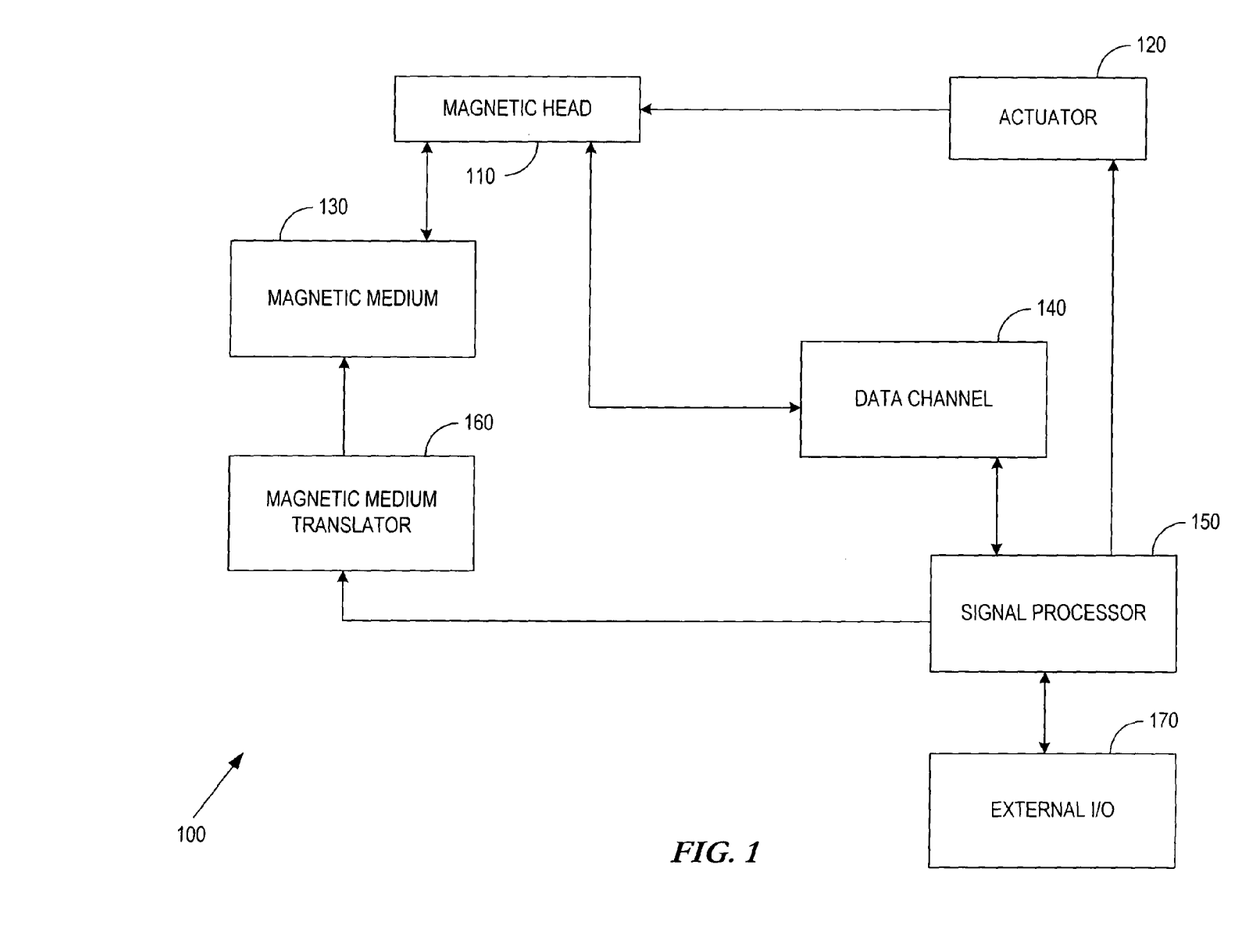
FIG. 1 illustrates a storage system according to the present invention.

FIG. 1 illustrates an exemplary storage system 100 according to the present invention. A magnetic head 110 is under control of an actuator 120, whereby the actuator 120 controls the position of the magnetic head 110. The magnetic head 110 writes and reads data on magnetic medium 130. The read/write signals are passed to a data channel 140. A signal processor 150 controls the actuator 120 and processes the signals of the data channel 140 for data exchange with external Input/Output (I/O) 170. External I/O 170 may provide, for example, data and control conduits for a desktop computing application which utilizes the storage system 100. In addition, magnetic medium translator 160 is controlled by the signal processor 150 to cause the magnetic medium 130 to move relative to the magnetic head 110. The present invention is not meant to be limited to a particular type of storage system 100 or to the type of magnetic medium 130 used in the storage system 100.

Figure 2:
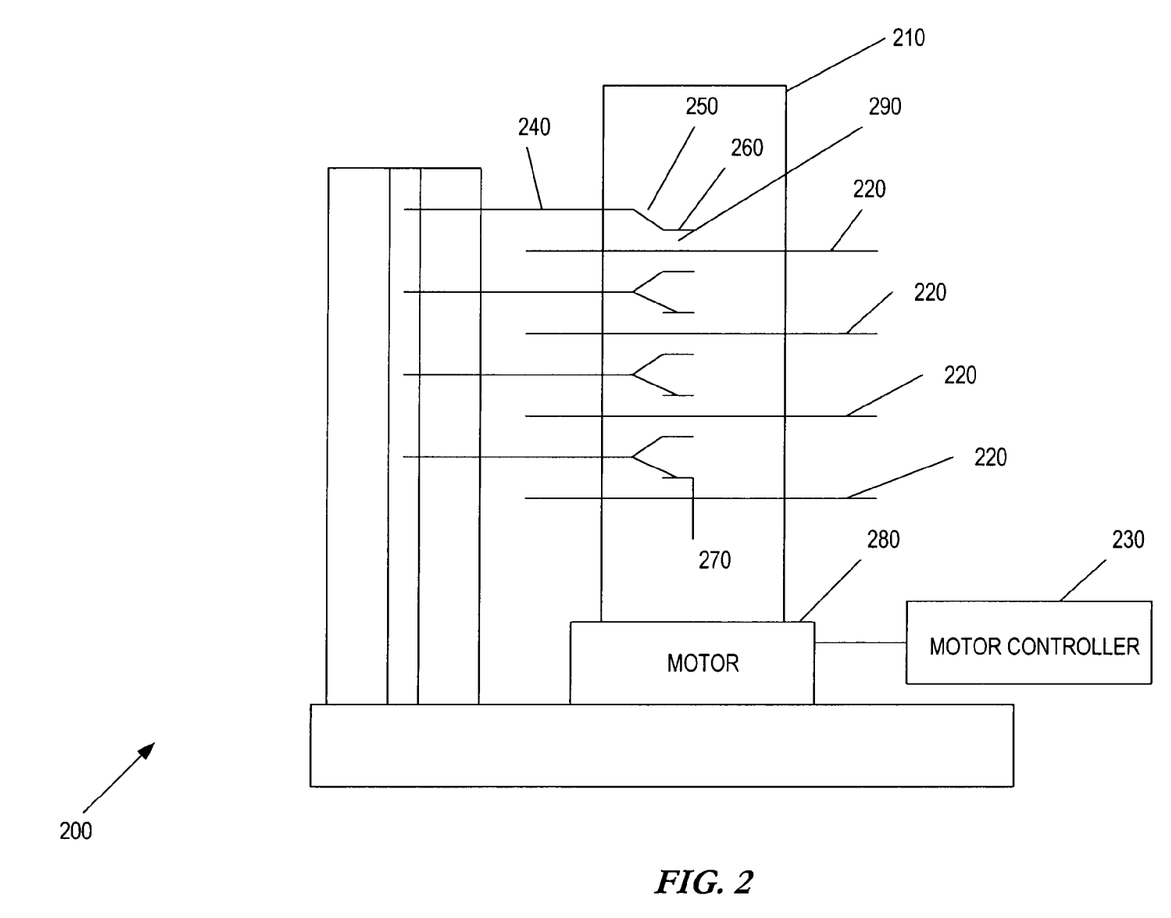
FIG. 2 illustrates one particular embodiment of a storage system according to the present invention.

FIG. 2 illustrates one particular embodiment of a multiple magnetic disk storage system 200 according to the present invention. In FIG. 2, a hard disk drive storage system 200 is shown. The storage system 200 includes a spindle 210 that supports and rotates multiple magnetic disks 220. The spindle 210 is rotated by a motor 280 that is controlled by a motor controller 230. At each surface of each magnetic disk 220, there is a magnetic head 270. The magnetic head 270 is mounted on a slider 260 that is supported by a suspension 250 and an actuator arm 240. Processing circuitry exchanges signals that represent write/read information with the magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and the actuator arm 240 position the slider 260 so that the magnetic head 270 is in a transducing relationship with a surface of the magnetic disk 220. When the magnetic disk 220 is rotated by a motor 280, the slider 240 is supported on a thin cushion of air, i.e., air bearing, between the surface of the magnetic disk 220 and the ABS 290. The magnetic head 270 may then be employed for writing information to multiple circular tracks on the surface of the magnetic disk 220, as well as for reading information therefrom.

Figure 3:
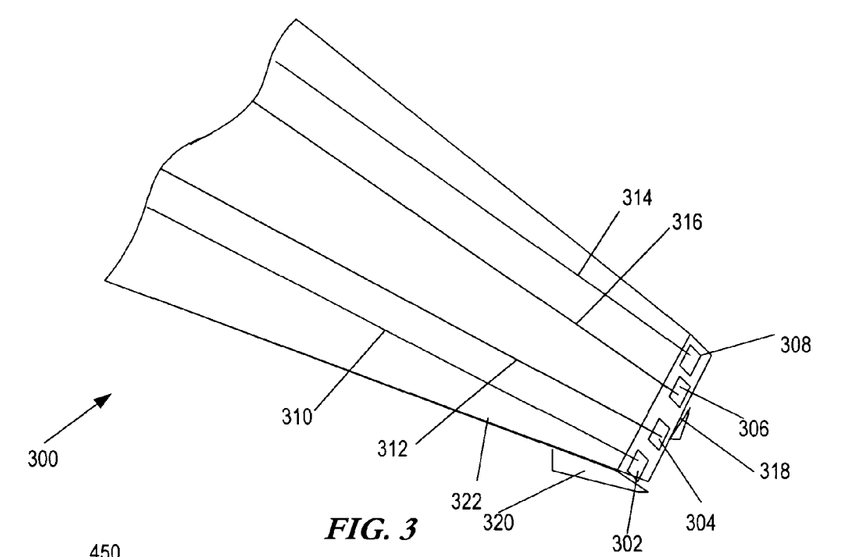
FIG. 3 illustrates a slider mounted on a suspension.

FIG. 3 illustrates slider/suspension combination 300 having a slider 320 mounted on a suspension 322. First and second solder connections 302 and 308 connect leads from the GMR sensor 318 to leads 310 and 314, respectively, on the suspension 322 and third and fourth solder connections 304 and 306 connect to the write coil (not shown) to leads 312 and 316, respectively, on the suspension 322.

Figure 4:
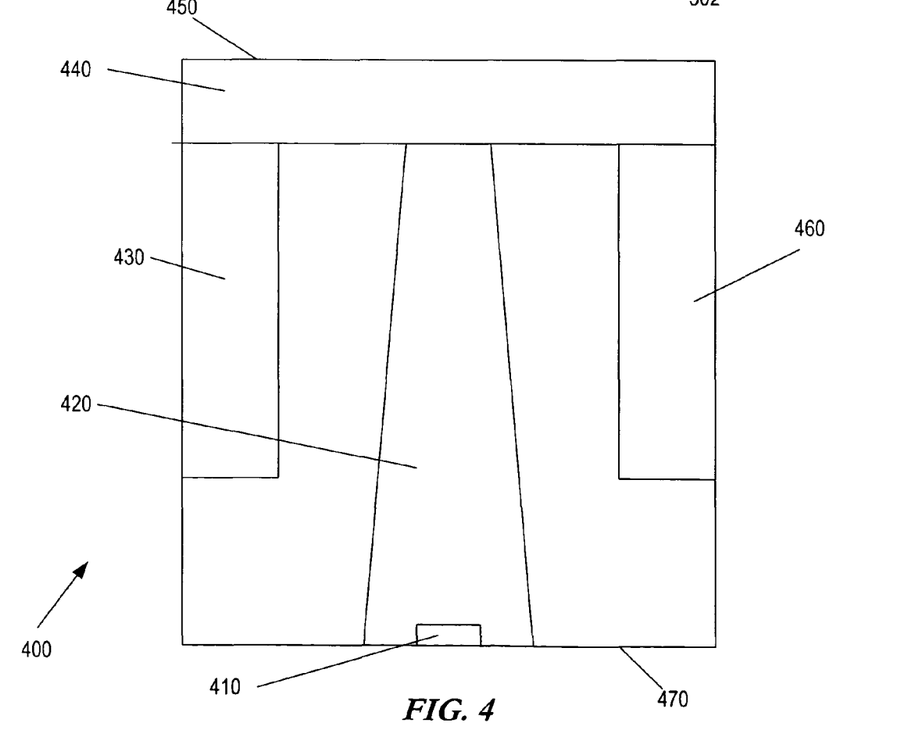
FIG. 4 illustrates an ABS view of the slider and the magnetic recording head.

FIG. 4 is an ABS view of a slider 400 and a magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of the slider 400 and the magnetic head 410 is at a trailing edge 470 of the slider 400.

The above description of a typical magnetic recording disk drive system, shown in the accompanying. FIGS. 1–4, are for presentation purposes only. Disk drives may contain a large number of disks and actuators, and each actuator may support a number of sliders. In addition, instead of an air-bearing slider, the head carrier may be one which maintains the magnetic head in contact or near contact with the magnetic disk, such as in liquid bearing and other contact and near-contact recording disk drives.

Figure 5A:
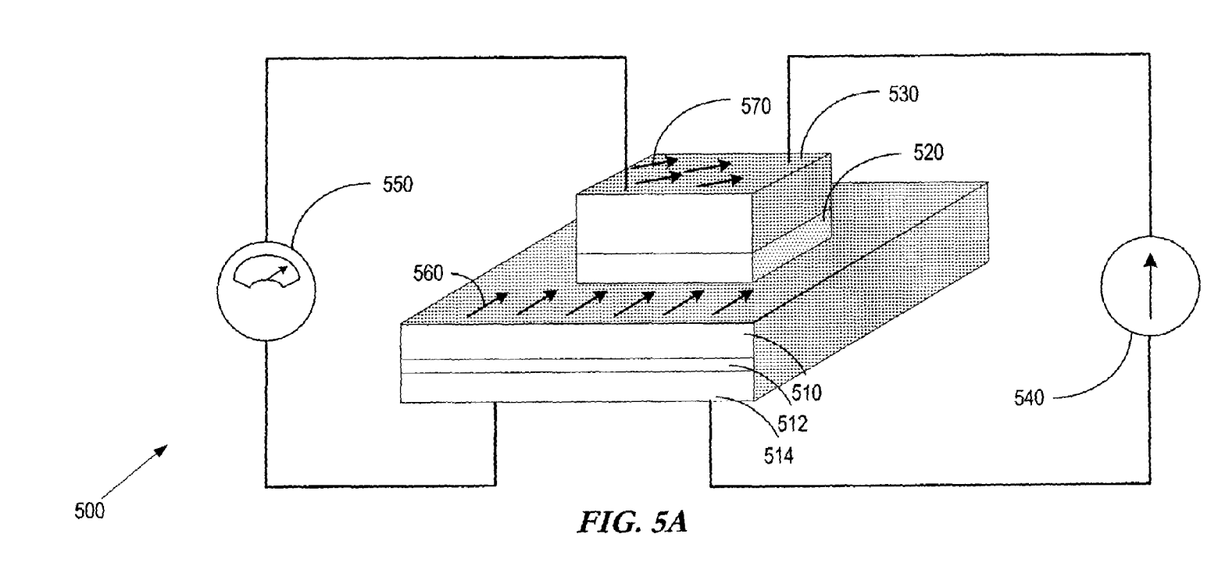
FIG. 5A illustrates an exemplary CPP GMR sensor in accordance with the present invention.

FIG. 5 illustrates one example of a CPP GMR sensor 500, suitable for use in a magnetic head. In this exemplary embodiment, the CPP GMR sensor 500 comprises a ferromagnetic reference layer 510, a ferromagnetic sense layer 530, and a conducting spacer layer 520 disposed between the ferromagnetic reference and sense layers 510 and 530. A sense current 540 flows through the conducting spacer layer 520 from the ferromagnetic reference layer 510 to the ferromagnetic sense layer 530, or conversely from the ferromagnetic sense layer 530 to the ferromagnetic reference layer 510. The resistance of the CPP GMR sensor 500 varies as a function of the relative orientations of the magnetization vectors 560 and 570 of the ferromagnetic reference and sense layers 510 and 530, respectively. The resistance variation is sensed by measuring voltage fluctuations measured across meter 550 caused by the product of sense current 540 with the variation of CPP GMR sensor 500 resistance.

In one embodiment, the ferromagnetic reference layer 510 is pinned by an AFM-pinning layer of at least 15 nanometers in thickness (not shown), which is disposed below and in contact with the ferromagnetic reference layer 510. The ferromagnetic reference layer 510 is preferably composed of Co—Fe, and the AFM-pinning layer is preferably composed of Pt—Mn.

In another embodiment, the ferromagnetic reference layer 510 is separated from a ferromagnetic keeper layer 514 by an AP-pinning layer 512. The AP pinning layer 512 is composed of a refractory metal, e.g., Ru, and the ferromagnetic reference and keeper layers 510 and 514 are preferably composed of Co—Fe. Both the ferromagnetic reference and keeper layers 510 and 514 are self-pinned through ferromagnetic/ferromagnetic AP coupling across the AP-pinning layer 512, their intrinsic uniaxial anisotropies, and their extrinsic uniaxial anisotropies. To achieve strong ferromagnetic/ferromagnetic AP coupling, it is crucial to ensure a zero net magnetic moment between the ferromagnetic reference and keeper layers 510 and 514. To achieve high intrinsic uniaxial anisotropies, it is crucial to select materials with high intrinsic uniaxial anisotropy fields for the ferromagnetic reference and keeper layers 510 and 514. To achieve high extrinsic uniaxial anisotropies, it is crucial to select materials with high positive saturation magnetostrictions for the ferromagnetic reference and keeper layers 510 and 514, and to apply compressive stresses during the fabrication process of the magnetic head.

Alternatively, the ferromagnetic keeper layer 514 may be pinned by an AFM-pinning layer of at least 15 nanometers in thickness (not shown), which is disposed below and in contact with the ferromagnetic keeper layer 514. The AFM-pinning layer is preferably composed of Pt—Mn.

Figure 5B:
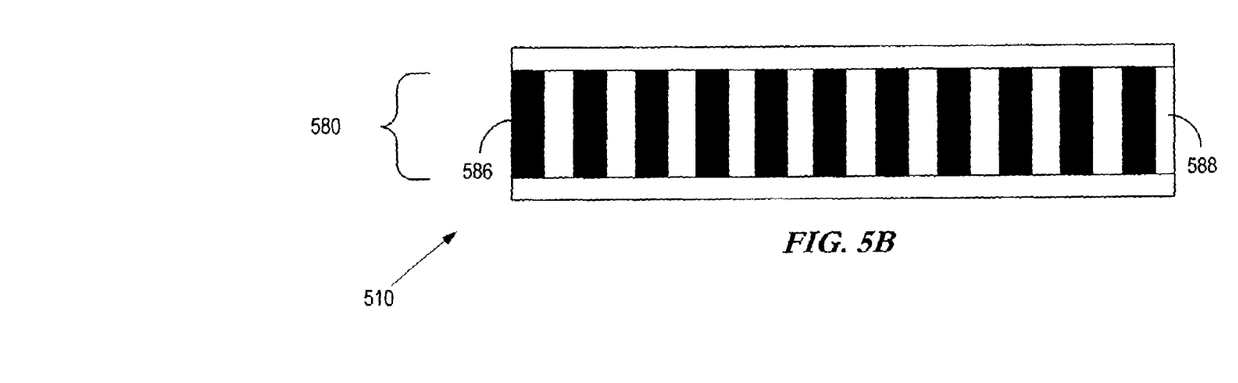
FIG. 5B illustrates a composite film of the CPP GMR sensor of FIG. 5A according to the present invention.

In both embodiments according to the present invention, a composite film 580, as shown in FIG. 5B, is embedded into the ferromagnetic reference layer 510 to provide the designed product of junction resistance and area. Alternately, the composite film 580, as shown in FIG. 5B, may be embedded into the ferromagnetic keeper layer 514 to provide the designed product of junction resistance and area.

The composite film 580, that is embedded either into the ferromagnetic reference layer 510 or into the ferromagnetic keeper layer 514, comprises a conducting phase 588 and an insulating phase 586. The insulating phase 586 confines the sense current 540 to flow only through the conducting phase 588. Since the composite film 580 exhibits the highest resistivity, ranging from 200 to 2,000 $\mu\Omega\text{-cm}^2$, among all other layers, it is the major resistance component in the serial circuit of the CPP GMR sensor 500. The product of junction resistance and area of the CPP GMR sensor 500 may thus be finely tuned in accordance with design needs by varying the volume fraction of the insulating phase.

To prevent a loss in pinning either the ferromagnetic keeper layer 514 or the ferromagnetic reference layer 510, the composite film 580 should be magnetic and thus either the conducting phase or the insulating phase must be magnetic. To prevent a loss in the magnetic moment of the composite film 580, the conducting phase and the insulating phase should be non-immiscible to each other during annealing. The conducting phase is thus preferably made of a metal, such as a Ni-based, a Co-based or an Fe-based alloy. The insulating phase is thus preferably made of a non-magnetic oxide, such as $Al_2O_3$, $CrO_x$, $MgO_x$, $HfO_x$ $SiO_2$, $YO_x$, $ZrO_x$, $YO_x$, etc.

Figure 6A:
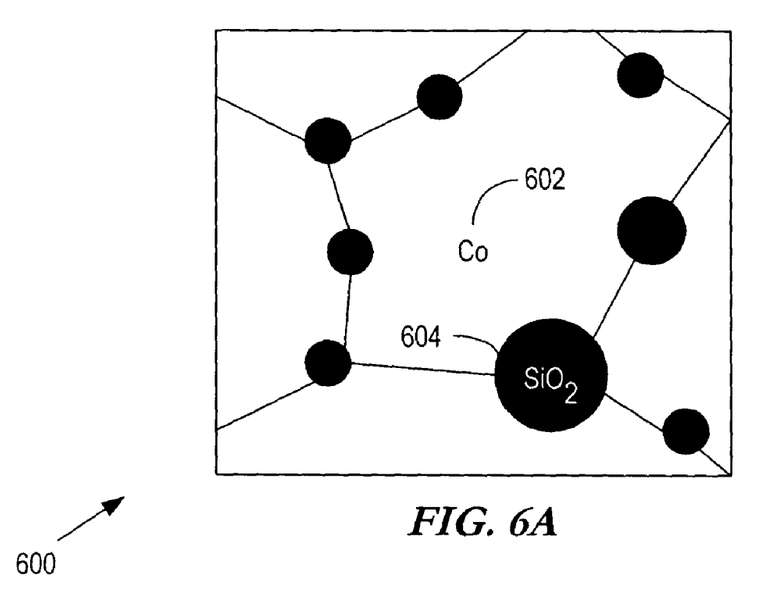
FIG. 6A illustrates an exemplary microstructure of the composite film of the CPP GMR sensor according to the present invention.

When the insulating phase has a lower volume fraction than the conducting phase, the composite film 580 exhibits a segregated microstructure 600, as shown in FIG. 6A, where particles 604 with the insulating phase 586 are segregated at boundaries of polycrystalline grains 602 with the conducting phase 588. For example, when a composite 80Co—20SiO$_2$ film is used, SiO$_2$ particles are segregated at boundaries of polycrystalline Co grains. The volume fraction of the insulating SiO$_2$ phase should be high enough in order for the SiO$_2$ particles to be larger than the thickness of the composite film 580, thus confining the sense current 540 to flow only through the conducting Co phase.

Figure 6B:
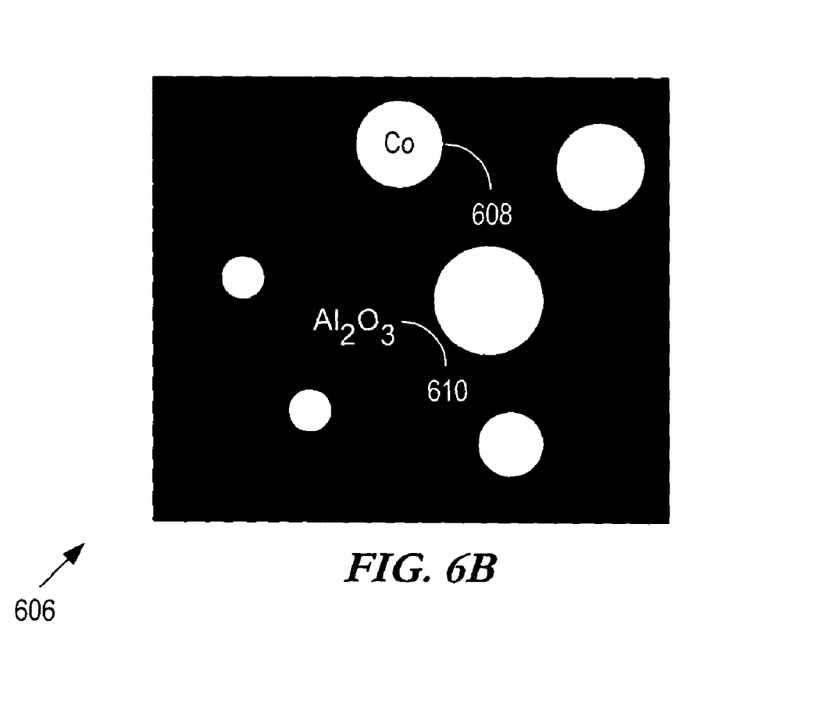
FIG. 6B illustrates an alternative microstructure of the composite film of the CPP GMR sensor according to the present invention.

When the insulating phase has a higher volume fraction than the conducting phase, the composite film 580 exhibits a granular microstructure 606, as shown in FIG. 6B, where individual grains 608 with the conducting phase 588 are distributed in an insulating matrix 610 with the insulating phase 586. For example, when a composite 40Co—60Al$_2$O$_3$ film is used, Co particles are distributed in an Al$_2$O$_3$ matrix. The volume fraction of the conducting Co phase should be high enough in order for the Co particles 608 to be larger than the thickness of the composite film 580, thus allowing the sense current 540 to flow through the Co particles 608.

Figure 7:
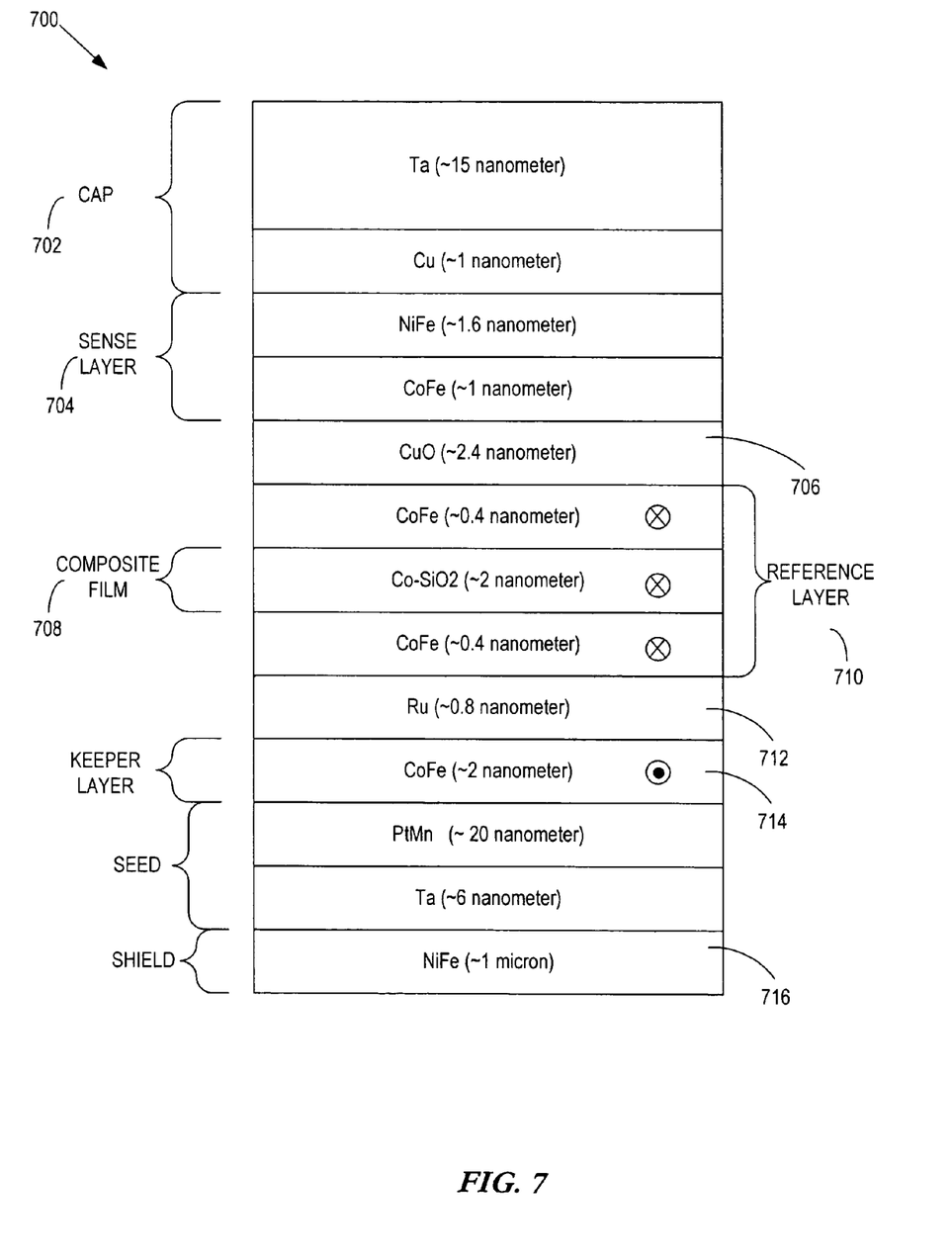
FIG. 7 illustrates an exemplary embodiment of a CPP GMR sensor according to the present invention.

FIG. 7 illustrates an ABS view of one embodiment of the exemplary CPP GMR sensor 700 in accordance with the present invention, where exemplary layer compositions and their corresponding thicknesses are listed for each layer. A ferromagnetic bottom shield layer 716 composed of approximately 1 micron thick Ni—Fe is deposited on an Al$_2$O$_3$-coated substrate (not shown). A non-magnetic seed layer composed of approximately 6 nanometer thick Ta and an AFM pinning layer composed of approximately 20 nanometer thick Pt—Mn are sequentially deposited on the ferromagnetic bottom shield layer 716.

A ferromagnetic keeper layer 714 composed of approximately 2 nanometer thick Co—Fe has a magnetic orientation perpendicular to and towards an ABS. An AP-pinning layer 712 composed of approximately 0.8 nanometer thick Ru provides ferromagnetic/ferromagnetic AP coupling. Ferromagnetic reference layers 710 composed of approximately 0.4 nanometer thick Co—Fe, approximately 2 nanometer thick Co—SiO$_2$ 708, and approximately 0.4 nanometer thick Co—Fe, have a magnetic orientation perpendicular to and away from the ABS.

The Co—SiO$_2$ composite film 708 is preferably deposited by sputtering from a Co target and a SiO$_2$ target simultaneously or sequentially. Alternatively, the SiO$_2$ film can be deposited by reactive sputtering in a mixture of argon and oxygen gases. Varying sputtering powers of the Co and SiO$_2$ targets leads to various volume fractions of Co and SiO$_2$. By carefully adjusting these volume fractions as discussed above, the product of junction resistance and area of the CPP GMR sensor can be finely tuned to the designed region, typically ranging from 0.1 to 1 $\Omega\text{-}\mu\text{m}^2$. In addition to SiO$_2$, the insulating phase of the composite film 708 may alternately be selected from any one of the following non-magnetic oxides, such as $Al_2O_3$, $CrO_x$, $MgO_x$, $HfO_x$, $YO_x$, $ZrO_x$, etc. In addition to Co, the conducting phase of the composite film 708 may alternately be selected from Ni-based, Co-based, or Fe-based alloys.

A conducting spacer layer 706 composed of approximately 2 nanometer thick Cu—O plays a key role in exhibiting a strong GMR effect. Ferromagnetic sense layers 704 composed of approximately 1 nanometer thick Co—Fe and approximately 1.6 nanometer thick Ni—Fe have a magnetic orientation parallel to the ABS. Cap layers 702 composed of approximately 1 nanometer thick Cu and approximately 15 nanometer thick Ta protect the ferromagnetic sense layers from oxygen penetration and from deterioration of their magnetic and GMR properties.

Figure 8:
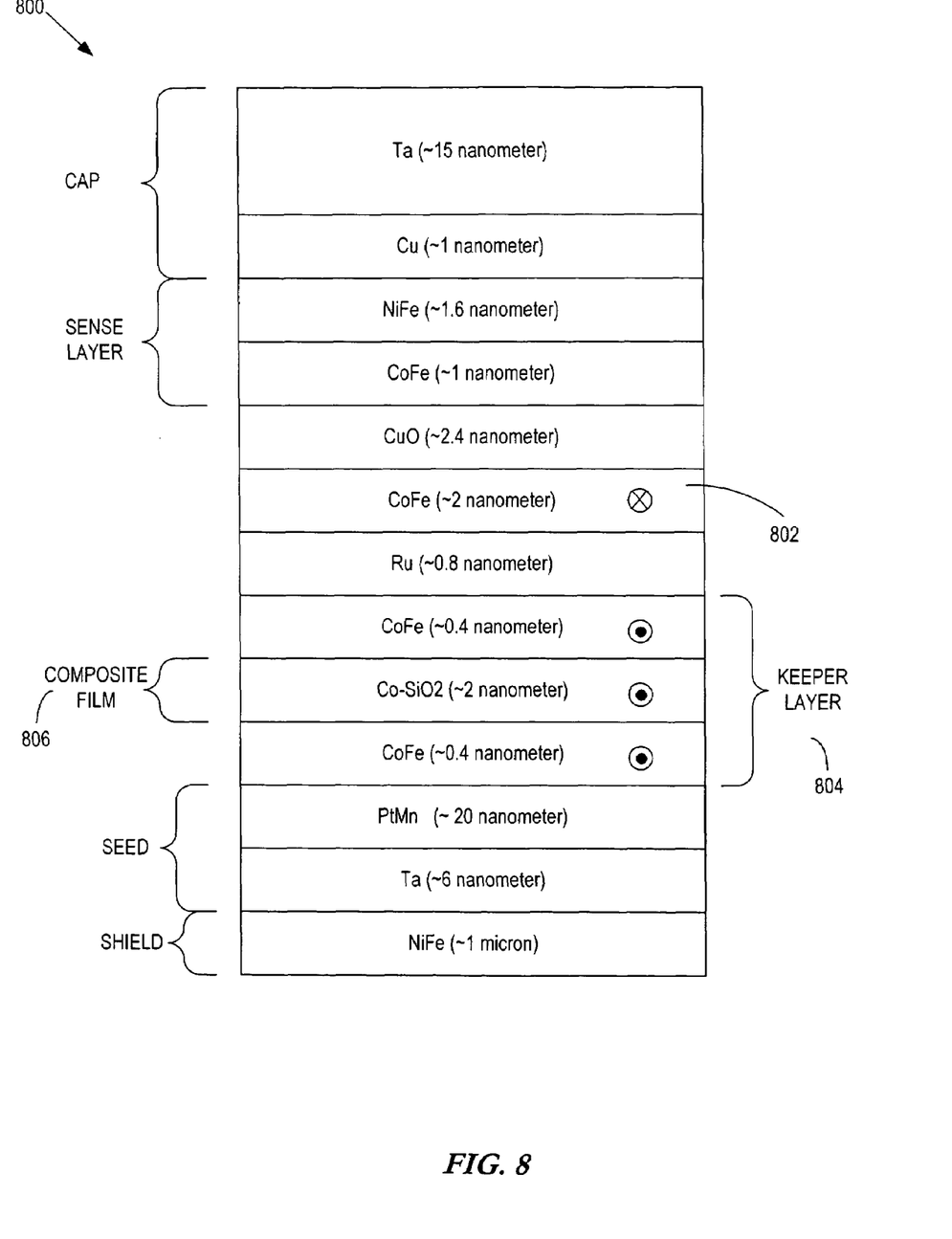
FIG. 8 illustrates an alternate embodiment of a CPP GMR sensor according to the present invention.

In an alternate embodiment, FIG. 8 illustrates an exemplary CPP GMR sensor 800 in accordance with the present invention. In this embodiment, the composite film 806 is embedded into the ferromagnetic keeper layer 804. The ferromagnetic keeper layer and the embedded composite films have the magnetic orientation as shown. The ferromagnetic reference layer 802 composed of approximately 2 nanometer thick Co—Fe has the magnetic orientation as shown.

In a further alternate embodiment, the structure of the CPP GMR sensor shown in FIG. 7 is reversed. For example, the CPP GMR sensor may comprise a ferromagnetic bottom shield layer, a Ta seed layer, Ni—Fe/Co—Fe sense layers, a Cu—O conducting layer, Co—Fe/Co—SiO$_2$/Co—Fe ferromagnetic reference layers, a Ru AP-pinning layer, a Co—Fe ferromagnetic keeper layer, a Pt—Mn AFM pinning layer, and a Ta cap layer.

In a further alternate embodiment, the structure of the CPP GMR sensor shown in FIG. 8 is reversed. For example, the CPP GMR sensor may comprise a ferromagnetic bottom shield layer, a Ta seed layer, Ni—Fe/Co—Fe sense layers, a Cu—O conducting spacer layer, a Co—Fe ferromagnetic reference layer, a Ru AP-pinning layer, Co—Fe/Co—SiO$_2$/Co—Fe ferromagnetic keeper layer, a Pt—Mn AFM pinning layer, and a Ta cap layer.

As mentioned above, the present invention provides a method and apparatus that embeds a composite film, composed of a conducting phase and an insulating phase, within either the ferromagnetic reference or ferromagnetic keeper layer. In so doing, the sense current is confined to flow only through the conducting portions of the composite film. The product of junction resistance and area may be finely tuned by adjusting the volume fraction of the insulating phase in the composite film.

According to the present invention, the fields of computers and magnetic data storage and recovery are improved by the formation a CPP GMR sensor as disclosed herein. Thus, the present invention improves not only the field of GMR sensors, but the entire field of computers and magnetic data storage and retrieval.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A Current-Perpendicular-to-Plane (CPP) Giant Magneto-Resistance (GMR) sensor comprising:
    a ferromagnetic keeper layer having a first magnetic orientation;
    a ferromagnetic reference layer having a second magnetic orientation anti-parallel to the first magnetic orientation;
    a ferromagnetic sense layer having a magnetic orientation that varies in response to an external magnetic field;
    a cap layer formed over and in contact with the ferromagnetic sense layer; and
    a composite film, disposed between other layers forming the ferromagnetic keeper layer or the ferromagnetic reference layer, the composite film comprising:
        a ferromagnetic metal having a first predetermined volume fraction of the composite film for providing a conducting phase; and
        a non-magnetic oxide having a second predetermined volume fraction of the composite film for providing an insulating phase;
    wherein a sense current is confined to flow only though the ferromagnetic metal of the composite film and the first and second predetermined volume fractions are selected to provide a predetermined junction resistance and area.

2. The CPP GMR sensor according to claim 1, wherein the non-magnetic oxide is formed with a lower volume fraction than the ferromagnetic metal.

3. The CPP GMR sensor according to claim 1, wherein the non-magnetic oxide is formed with a higher volume fraction than the ferromagnetic metal.

4. The CPP GMR sensor according to claim 1, further comprising:
    an anti-parallel pinning layer formed between the ferromagnetic keeper and reference layers; and
    a conducting spacer layer formed between the ferromagnetic sense and reference layers.

5. The CPP GMR sensor according to claim 1, wherein the composite film is embedded into the ferromagnetic keeper layer.

6. The CPP GMR sensor according to claim 1, wherein the composite film is embedded into the ferromagnetic reference layer.

7. A magnetic storage system, comprising:
    a magnetic recording medium;
    a Current-Perpendicular-to-Plane (CPP) Giant Magneto-Resistance (GMR) sensor disposed proximate to the recording medium, the CPP GMR sensor including:
        a ferromagnetic keeper layer having a first magnetic orientation;
        a ferromagnetic reference layer having a second magnetic orientation anti-parallel to the first magnetic orientation;
        a ferromagnetic sense layer having a magnetic orientation that varies in response to an external magnetic field;
        a cap layer formed over and in contact with the ferromagnetic sense layer; and
        a composite film, disposed within the ferromagnetic keeper layer or the ferromagnetic reference layer, the composite film comprising:
            a ferromagnetic metal having a first predetermined volume fraction of the composite film for providing a conducting phase; and
            a non-magnetic oxide having a second predetermined volume fraction of the composite film for providing an insulating phase;
        wherein a sense current is confined to flow only though the ferromagnetic metal of the composite film and the first and second predetermined volume fractions are selected to provide a predetermined junction resistance and area.

8. The magnetic storage system according to claim 7, wherein the magnetic oxide is formed with a lower volume fraction than the ferromagnetic metal.

9. The magnetic storage system according to claim 7, wherein the magnetic oxide is formed with a higher volume fraction than the ferromagnetic metal.

10. The magnetic storage system according to claim 7, further comprising:
    an anti-parallel pinning layer formed between the ferromagnetic keeper and reference layers; and
    a conducting spacer layer formed between the ferromagnetic sense and reference layers.

11. The magnetic storage system according to claim 7, wherein the composite film is embedded into the ferromagnetic keeper layer.

12. The magnetic storage system according to claim 7, wherein the composite film is embedded into the ferromagnetic reference layer.

* * * * *